US012020852B2

(12) United States Patent
Otani et al.

(10) Patent No.: US 12,020,852 B2
(45) Date of Patent: Jun. 25, 2024

(54) ELECTRONIC COMPONENT

(71) Applicant: Murata Manufacturing Co., Ltd., Kyoto-fu (JP)

(72) Inventors: Shinji Otani, Nagaokakyo (JP); Hiroki Imaeda, Nagaokakyo (JP); Namiko Sasajima, Nagaokakyo (JP); Tomohiro Sunaga, Nagaokakyo (JP); Masami Okado, Nagaokakyo (JP); Yoshimasa Yoshioka, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 552 days.

(21) Appl. No.: 17/371,793

(22) Filed: Jul. 9, 2021

(65) Prior Publication Data

US 2022/0020526 A1 Jan. 20, 2022

(30) Foreign Application Priority Data

Jul. 16, 2020 (JP) ................................ 2020-122351

(51) Int. Cl.

*H01F 27/29* (2006.01)
*H01F 27/255* (2006.01)
*H01F 27/28* (2006.01)

(52) U.S. Cl.

CPC ......... *H01F 27/292* (2013.01); *H01F 27/255* (2013.01); *H01F 27/2804* (2013.01); *H01F 2027/2809* (2013.01)

(58) Field of Classification Search

CPC .. H01F 27/292; H01F 27/255; H01F 27/2804; H01F 2027/2809; H01F 19/04; H01F 17/04; H01F 27/29; H01F 27/34; H01F 2017/048

See application file for complete search history.

(56) References Cited

FOREIGN PATENT DOCUMENTS

| | | | | | |
|---|---|---|---|---|---|
| JP | 2017-103423 A | | 6/2017 | | |
| JP | 2017-107971 A | | 6/2017 | | |
| JP | 2017-123406 A | | 7/2017 | | |
| JP | 2017123406 A | * | 7/2017 | .............. | G01B 7/10 |
| JP | 2017-201718 A | | 11/2017 | | |
| JP | 2019-021781 A | | 2/2019 | | |
| JP | 2019-075478 A | | 5/2019 | | |

* cited by examiner

*Primary Examiner* — Shawki S Ismail
*Assistant Examiner* — Eric Arthur Waterstreet
(74) *Attorney, Agent, or Firm* — Studebaker & Brackett PC

(57) ABSTRACT

An electronic component includes a composite body made of a composite material of resin and magnetic metal particles, an inner electrode which is provided in the composite body and which has an end surface exposed from an outer surface of the composite body, and a metal film provided on the outer surface of the composite body and on the end surface of the inner electrode. The metal film includes a first region provided on the end surface of the inner electrode and a second region which is in contact with the magnetic metal particles exposed at the outer surface of the composite body and which is provided on the outer surface of the composite body. The thickness of the first region is less than the thickness of the second region.

20 Claims, 6 Drawing Sheets

ELECTRONIC COMPONENT

CROSS-REFERENCE TO RELATED APPLICATION

This application claims benefit of priority to Japanese Patent Application No. 2020-122351, filed Jul. 16, 2020, the entire content of which is incorporated herein by reference.

BACKGROUND

Technical Field

The present disclosure relates to an electronic component.

Background Art

A known electronic component is described in Japanese Unexamined Patent Application Publication No. 2017-103423. The electronic component described in Japanese Unexamined Patent Application Publication No. 2017-103423 includes a composite body made of a composite material of resin and a magnetic metal powder, an inner electrode which is provided in the composite body and which has an end surface exposed from an outer surface of the composite body, and a metal film provided on the outer surface of the composite body and on the end surface of the inner electrode.

SUMMARY

It has been found that, in the electronic component described above, there is room for improvement in the electrical resistance of the electronic component in a case where an external circuit is connected to the metal film. The inventors have performed intensive investigations and, as a result, have found that there is room for improvement in the electrical resistance between the external circuit and an end surface of the inner electrode, that is, the electrical resistance of the metal film.

In particular, in the electronic component described above, in a case where the external circuit is connected to the metal film that is provided on the end surface of the inner electrode, the electrical resistance (hereinafter also referred to as the circuit resistance) of a wiring between the external circuit and the inner electrode can be reduced by uniformly reducing the whole thickness of the metal film.

However, in a case where the external circuit is connected to the metal film that is provided on the outer surface of the composite body, the circuit resistance cannot be reduced even though the whole thickness of the metal film is uniformly reduced. As described above, it has been found that the circuit resistance cannot be fully reduced depending on a location of the metal film that is connected to the external circuit.

Accordingly, the present disclosure provides an electronic component of which the electrical resistance can be reduced in a case where the electronic component is connected to an external circuit.

According to a preferred embodiment of the present disclosure, an electronic component includes a composite body made of a composite material of resin and magnetic metal particles, an inner electrode which is provided in the composite body and which has an end surface exposed from an outer surface of the composite body, and a metal film provided on the outer surface of the composite body and on the end surface of the inner electrode. The metal film includes a first region provided on the end surface of the inner electrode and a second region which is in contact with the magnetic metal particles exposed at the outer surface of the composite body and which is provided on the outer surface of the composite body. The thickness of the first region is less than the thickness of the second region.

According to the above embodiment, in a case where the electronic component is connected, at the first region, to an external circuit, the thickness of the first region is a factor determining the length of a wiring between the external circuit and the inner electrode. In this case, since the thickness of the first region is enabled to be small, the length of the wiring can be shortened and the circuit resistance can be reduced.

On the other hand, in a case where the electronic component is connected, at the second region, to the external circuit, the thickness of the second region is a factor determining the cross-sectional area of the wiring between the external circuit and the inner electrode. In this case, since the thickness of the second region is enabled to be large, the cross-sectional area of the wiring can be enlarged and the circuit resistance can be reduced.

Thus, in each of the above cases, the circuit resistance can be reduced.

The phrase "the thickness of the first region" as used herein refers to the thickness of the first region in a direction perpendicular to a surface which is one of outer surfaces of the composite body and on which the metal film is provided. The phrase "the thickness of the second region" as used herein refers to the thickness of the second region in the direction perpendicular to the surface which is one of outer surfaces of the composite body and on which the metal film is provided.

According to an embodiment of the present disclosure, the following electronic component can be provided: an electronic component of which the electrical resistance can be reduced without depending on a location of a metal film that is connected to an external circuit in a case where the electronic component is connected to the external circuit.

Other features, elements, characteristics and advantages of the present disclosure will become more apparent from the following detailed description of preferred embodiments of the present disclosure with reference to the attached drawings.

DETAILED DESCRIPTION

Electronic components according to embodiments of the present disclosure are described below in detail with reference to the attached drawings. The drawings include partly schematic views and do not reflect actual sizes or ratios in some cases.

First Embodiment

Configuration

Figure 1A:
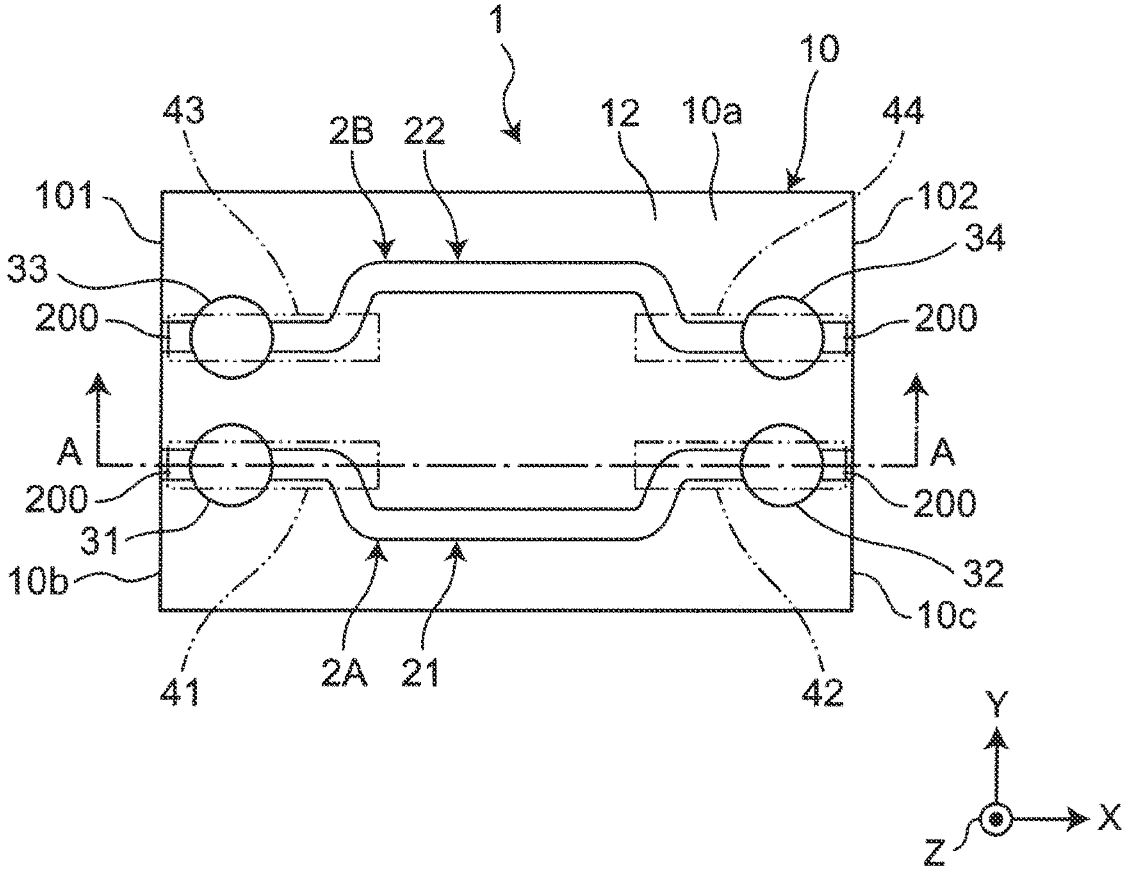
FIG. 1A is a perspective plan view of an electronic component according to a first embodiment, the electronic component being an inductor component.
Figure 1B:
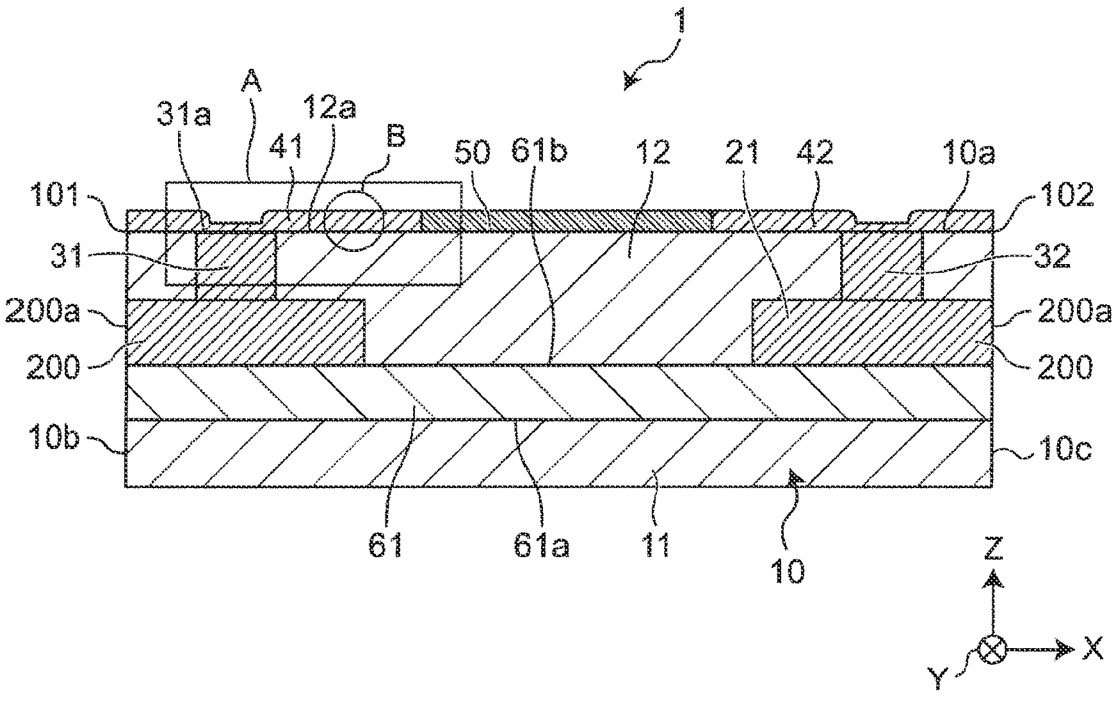
FIG. 1B is a sectional view taken along the line A-A of FIG. 1A.

FIG. 1A is a perspective plan view of an electronic component according to a first embodiment. FIG. 1B is a sectional view taken along the line A-A of FIG. 1A.

The electronic component is, for example, an inductor component 1. The inductor component 1 is, for example, a surface-mount electronic component mounted on a circuit board mounted in an electronic device such as a personal computer, a DVD player, a digital camera, a TV, a mobile phone, or a car electronic system. The inductor component 1 is not limited to such a surface-mount electronic component and may be a board-mounted electronic component. The inductor component 1 is, for example, a component with substantially a cuboid shape as a whole. The shape of the inductor component 1 is not particularly limited and may be substantially a cylindrical shape, a polygonal column shape, a truncated cone shape, or a prismoid shape.

As illustrated in FIGS. 1A and 1B, the inductor component 1 includes an element body 10 having insulating properties; a first inductor element 2A; a second inductor element 2B, the first and second inductor elements 2A and 2B being provided in the element body 10; a first columnar wiring 31; a second columnar wiring 32; a third columnar wiring 33; a fourth columnar wiring 34, the first, second, third, and fourth columnar wirings 31, 32, 33, and 34 being embedded in the element body 10 so as to have an end surface exposed from a rectangular first principal surface 10*a* of the element body 10; a first external terminal 41; a second external terminal 42; a third external terminal 43; a fourth external terminal 44, the first, second, third, and fourth external terminals 41, 42, 43, and 44 being provided on the first principal surface 10*a* of the element body 10; and an insulating film 50 provided on the first principal surface 10*a* of the element body 10. In FIGS. 1A and 1B, a direction substantially parallel to the thickness of the inductor component 1 is a Z-direction, the positive Z-direction is toward an upper side, and the negative Z-direction is toward a lower side. In a plane substantially perpendicular to the Z-direction, a direction substantially parallel to the length of the inductor component 1 is an X-direction and a direction substantially parallel to the width of the inductor component 1 is a Y-direction.

The element body 10 includes an insulating layer 61, a first magnetic layer 11 provided on the lower surface 61*a* of the insulating layer 61, and a second magnetic layer 12 provided on the upper surface 61*b* of the insulating layer 61. The first principal surface 10*a* of the element body 10 corresponds to the upper surface of the second magnetic layer 12. The element body 10 has a three-layer structure made of the insulating layer 61, the first magnetic layer 11, and the second magnetic layer 12. The element body 10 may have a one-layer structure consisting of a magnetic layer only, a two-layer structure consisting of a magnetic layer and an insulating layer only, or a four or more-layer structure composed of a plurality of magnetic layers and insulating layers.

The insulating layer 61 has insulating properties and has a principal surface with substantially a rectangular shape. The thickness of the insulating layer 61 is, for example, about 10 μm to 100 μm. The insulating layer 61 is preferably, for example, an insulating resin layer made of an epoxy resin or polyimide resin free from a matrix such as a glass cloth from the viewpoint of the reduction of profile. The insulating layer 61 may be a sintered body layer made of a magnetic material such as Ni—Zn ferrite or Mn—Zn ferrite or a nonmagnetic material such as alumina or glass or may be a resin substrate layer containing a base material such as a glass-epoxy composite. When the insulating layer 61 is the sintered body layer, the strength and flatness of the insulating layer 61 can be ensured, thereby enhancing the workability of a laminate on the insulating layer 61. When the insulating layer 61 is the sintered body layer, the insulating layer 61 is preferably polished from the viewpoint of the reduction of profile and is particularly preferably polished from a lower side having no laminate.

The first magnetic layer 11 and the second magnetic layer 12 have high permeability, have a principal surface with substantially a rectangular shape, and contain resin 135 and magnetic metal particles 136 dispersed in the resin 135. That is, the first magnetic layer 11 and the second magnetic layer 12 are composite bodies containing the resin 135 and the magnetic metal particles 136. The resin 135 is, for example, an organic insulating material made of an epoxy resin, bismaleimide, a liquid crystal polymer, polyimide, or the like. The magnetic metal particles 136 preferably contain Fe and may contain a Fe-based magnetic metal material such as Fe alone, an Fe—Si alloy such as Fe—Si—Cr, an Fe—Co alloy, an Fe alloy such as Ni—Fe, or an amorphous alloy thereof. The average size of the magnetic metal particles 136 is, for example, about 0.1 μm to 5 μm. At the stage of manufacturing the inductor component 1, the average size of the magnetic metal particles 136 can be calculated as a size ($D_{50}$) corresponding to a cumulative percentage of 50% in a size distribution determined by a laser diffraction/scattering method. The content of the magnetic metal particles 136 in each of the first magnetic layer 11 and the second magnetic layer 12 is preferably about 20% by volume to 70% by volume. When the average size of the magnetic metal particles 136 is about 5 μm or less, direct-current superposition characteristics are enhanced and the core loss at high frequency can be reduced by fine powder.

The first inductor element 2A and the second inductor element 2B include a first inductor wiring 21 and a second inductor wiring 22, respectively, provided substantially in parallel to the first principal surface 10*a* of the element body 10. This enables the first inductor element 2A and the second inductor element 2B to be configured substantially in parallel to the first principal surface 10*a*, thereby enabling the reduction in profile of the inductor component 1. The first inductor wiring 21 and the second inductor wiring 22 are provided on substantially the same plane in the element body 10. In particular, the first inductor wiring 21 and the second inductor wiring 22 are provided only on the upper side of the insulating layer 61, that is, the upper surface 61*b* of the insulating layer 61 and is covered by the second magnetic layer 12.

The first and second inductor wirings 21 and 22 are two-dimensionally wound. In particular, the first and second inductor wirings 21 and 22 have a semi-elliptical arch shape as viewed from the Z-direction. That is, the first and second inductor wirings 21 and 22 are curved wirings wound substantially halfway. The first and second inductor wirings 21 and 22 each include a straight portion in an intermediate section. In this application, the term “spiral” of an inductor wiring refers to a two-dimensionally wound curved shape including a spiral shape and includes a curved shape with one turn or less like the first and second inductor wirings 21 and 22. The curved shape may include a partly straight portion.

The thickness of the first and second inductor wirings 21 and 22 is preferably, for example, about 40 μm to 120 μm. In an example, the first and second inductor wirings 21 and 22 have a thickness of about 45 μm, a width of about 40 μm, and an interwiring space of about 10 μm. The interwiring space is preferably 3 μm to 20 μm from the viewpoint of ensuring insulating properties.

The first and second inductor wirings 21 and 22 are made of, for example, an electrically conductive material, that is, a low-electrical resistance metal material such as Cu, Ag, or Au. In this embodiment, the inductor component 1 includes the first and second inductor wirings 21 and 22, which are provided in a single layer only. This enables the reduction in profile of the inductor component 1. The first and second inductor wirings 21 and 22 may be metal films and may have a structure in which an electrically conductive layer made of Cu, Ag, or the like is provided on a base layer formed by electroless plating using Cu, Ti, or the like.

The first inductor wiring 21 has a first end and second end which are each located at an outer side portion and which are electrically connected to the first columnar wiring 31 and the second columnar wiring 32, respectively, and is curved to form an arch from the first columnar wiring 31 and the second columnar wiring 32 toward the central side of the inductor component 1. Furthermore, the first inductor wiring 21 includes pad sections which are located at both ends thereof and which have a width larger than that of spiral-shaped sections. The pad sections are directly connected to the first and second columnar wirings 31 and 32.

Likewise, the second inductor wiring 22 has a first end and second end which are each located at an outer side portion and which are electrically connected to the third columnar wiring 33 and the fourth columnar wiring 34, respectively, and is curved to form an arch from the third columnar wiring 33 and the fourth columnar wiring 34 toward the central side of the inductor component 1.

Herein, suppose that, in each of the first and second inductor wirings 21 and 22, a range surrounded by curved wirings formed by the first and second inductor wirings 21 and 22 and straight lines connecting both ends of the first and second inductor wirings 21 and 22 is an inside diameter section. In this supposition, when viewed from the Z-direction, the inside diameter sections of the first and second inductor wirings 21 and 22 do not overlap each other and the first and second inductor wirings 21 and 22 are separated from each other.

Furthermore, wirings extend from connections between the first and second inductor wirings 21 and 22 and the first to fourth columnar wirings 31 to 34 in a direction which is substantially parallel to the X-direction and which is outward the inductor component 1. These wirings are exposed to the outside of the inductor component 1. That is, each of the first and second inductor wirings 21 and 22 includes exposed sections 200 exposed to the outside from side surfaces (surfaces substantially parallel to the Y-Z plane) substantially parallel to a lamination direction of the inductor component 1.

These wirings are connected to feeder wirings used to perform additional electroplating after the formation of the first and second inductor wirings 21 and 22 in the course of manufacturing the inductor component 1. The feeder wirings enable additional electroplating to be readily performed on an inductor substrate before being divided into inductor components 1, thereby enabling the interwiring distance to be reduced. Performing additional electroplating to reduce the distance between the first and second inductor wirings 21 and 22 allows the magnetic coupling between the first and second inductor wirings 21 and 22 to be increased, increases the width of the first and second inductor wirings 21 and 22 to reduce the electrical resistance, and enables outer dimensions of the inductor component 1 to be reduced.

Since each of the first and second inductor wirings 21 and 22 includes the exposed sections 200, the electrostatic breakdown resistance of the inductor substrate during processing can be ensured. In the first and second inductor wirings 21 and 22, it is preferable that the thickness (size in the Z-direction) of an exposed surface 200*a* of each exposed section 200 is less than the thickness (size in the Z-direction) of the first and second inductor wirings 21 and 22 and is 45 μm or more. When the thickness of the exposed surface 200*a* is less than the thickness of the first and second inductor wirings 21 and 22, the percentage of the first and second magnetic layers 11 and 12 can be increased, thereby enabling the inductance to be enhanced. When the thickness of the exposed surface 200*a* is 45 μm or more, the occurrence of disconnection in the vicinity of the exposed surface 200*a* can be reduced. The exposed surface 200*a* is preferably an oxide film. This enables a short circuit between the inductor component 1 and a component adjacent thereto to be suppressed.

The first to fourth columnar wirings 31 to 34 extend from the first and second inductor wirings 21 and 22 in the Z-direction and penetrate an inner portion of the second magnetic layer 12. The first columnar wiring 31 extends upward from the upper surface of one end of the first inductor wiring 21 and has an end surface exposed from the first principal surface 10*a* of the element body 10. The second columnar wiring 32 extends upward from the upper surface of the other end of the first inductor wiring 21 and has an end surface exposed from the first principal surface 10*a* of the element body 10. The third columnar wiring 33 extends upward from the upper surface of one end of the second inductor wiring 22 and has an end surface exposed from the first principal surface 10*a* of the element body 10. The fourth columnar wiring 34 extends upward from the upper surface of the other end of the second inductor wiring 22 and has an end surface exposed from the first principal surface 10*a* of the element body 10.

Thus, the first columnar wiring 31, the second columnar wiring 32, the third columnar wiring 33, and the fourth columnar wiring 34 linearly extend from the first inductor element 2A and the second inductor element 2B to the end surfaces exposed from the first principal surface 10*a* in a direction substantially perpendicular to the end surfaces. This enables the first external terminal 41, the second external terminal 42, the third external terminal 43, and the fourth external terminal 44 to be connected to the first inductor element 2A and the second inductor element 2B with a shorter distance, thereby allowing the inductor component 1 to have low resistance and high inductance. The first to fourth columnar wirings 31 to 34 are made of an electrically conductive material and may be made of, for example, substantially the same material as the first and second inductor wirings 21 and 22.

The first to fourth external terminals 41 to 44 are provided on the first principal surface 10*a* of the element body 10. The first to fourth external terminals 41 to 44 are metal films provided on an outer surface of the second magnetic layer 12. The first external terminal 41 is in contact with the end surface of the first columnar wiring 31 that is exposed from the first principal surface 10*a* of the element body 10 and is electrically connected to the first columnar wiring 31. This allows the first external terminal 41 to be electrically connected to one end of the first inductor wiring 21. The second external terminal 42 is in contact with the end surface of the second columnar wiring 32 that is exposed from the first principal surface 10*a* of the element body 10 and is electrically connected to the second columnar wiring 32. This allows the second external terminal 42 to be electrically connected to the other end of the first inductor wiring 21.

Likewise, the third external terminal 43 is in contact with an end surface of the third columnar wiring 33, is electrically connected to the third columnar wiring 33, and is electrically connected to one end of the second inductor wiring 22. The fourth external terminal 44 is in contact with an end surface of the fourth columnar wiring 34, is electrically connected to the fourth columnar wiring 34, and is electrically connected to the other end of the second inductor wiring 22.

In the inductor component 1, the first principal surface 10*a* has a first end edge 101 and second end edge 102 which correspond to sides of a rectangle and which extend linearly. The first end edge 101 is an end edge of the first principal surface 10*a* that leads to a first side surface 10*b* of the element body 10. The second end edge 102 is an end edge of the first principal surface 10*a* that leads to a second side surface 10*c* of the element body 10. The first external terminal 41 and the third external terminal 43 are arranged along the first end edge 101, which is on the first side surface 10*b* side of the element body 10. The second external terminal 42 and the fourth external terminal 44 are arranged along the second end edge 102, which is on the second side surface 10*c* side of the element body 10. When viewed from a direction substantially perpendicular to the first principal surface 10*a* of the element body 10, the first side surface 10*b* and second side surface 10*c* of the element body 10 are surfaces along the Y-direction and coincide with the first end edge 101 and the second end edge 102, respectively. A direction in which the first external terminal 41 and the third external terminal 43 are arranged is a direction connecting the center of the first external terminal 41 to the center of the third external terminal 43. A direction in which the second external terminal 42 and the fourth external terminal 44 are arranged is a direction connecting the center of the second external terminal 42 to the center of the fourth external terminal 44.

The insulating film 50 is provided on a portion of the first principal surface 10*a* of the element body 10 that is provided with none of the first to fourth external terminals 41 to 44. The insulating film 50 may overlap the first to fourth external terminals 41 to 44 in the Z-direction such that end portions of the first to fourth external terminals 41 to 44 overlie the insulating film 50. The insulating film 50 is made of, for example, a resin material, such as an acrylic resin, an epoxy resin, or polyimide, having high electrical insulation properties. This enables the insulation between the first to fourth external terminals 41 to 44 to be enhanced. The insulating film 50 serves as a mask when a pattern of the first to fourth external terminals 41 to 44 is formed. This leads to an increase in manufacturing efficiency. The insulating film 50 covers the exposed magnetic metal particles 136 and therefore can prevent the magnetic metal particles 136 from being exposed to the outside when the magnetic metal particles 136 are exposed from the resin 135. The insulating film 50 may contain filler made of an insulating material such as silica or barium sulfate.

Figure 2:
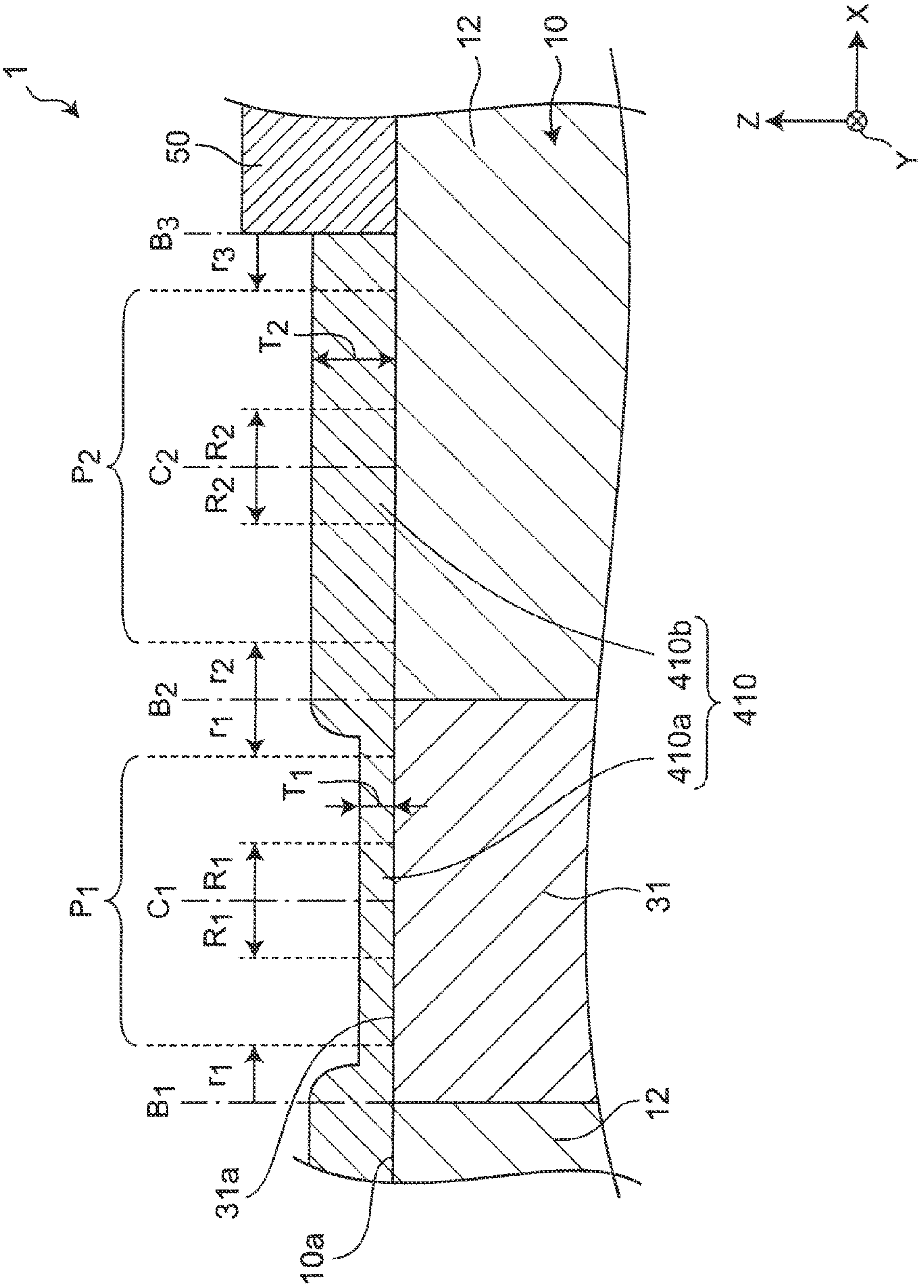
FIG. 2 is a partly enlarged view of FIG. 1B.
Figure 3:
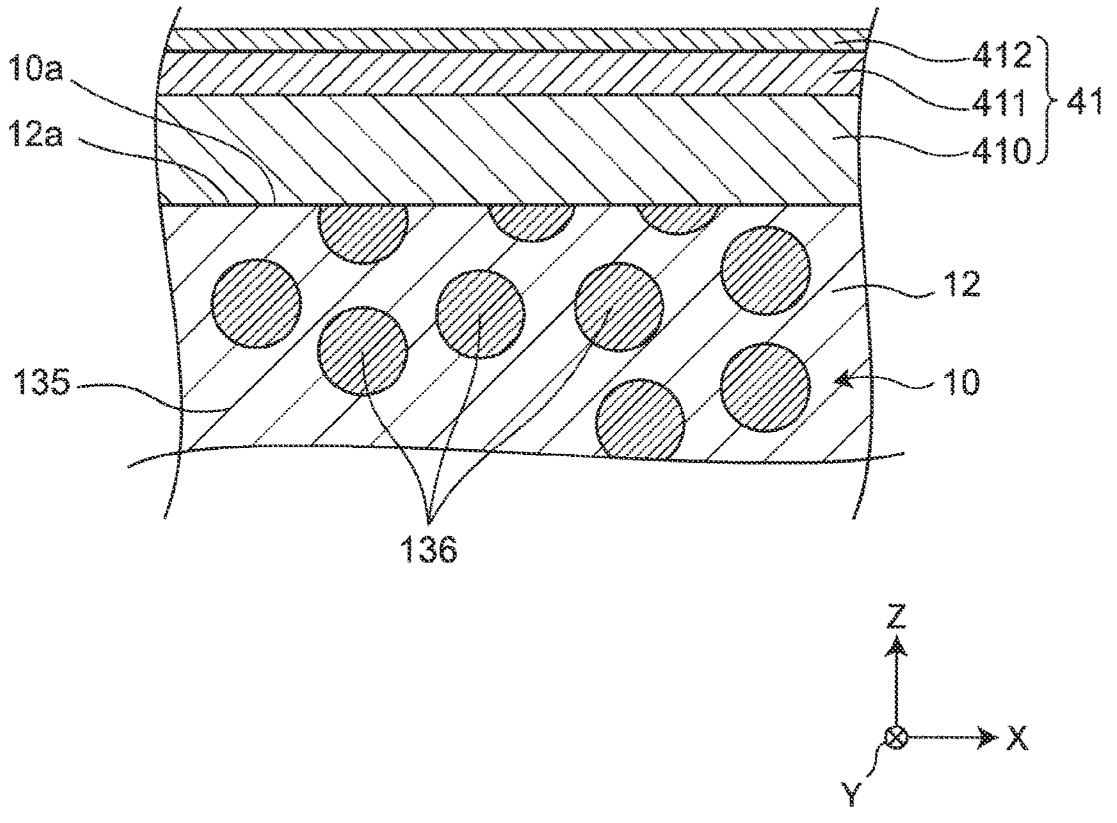
FIG. 3 is a partly enlarged view of FIG. 1B.

FIG. 2 is an enlarged view of part A of FIG. 1B. FIG. 3 is an enlarged view of part B of FIG. 1B. As illustrated in FIGS. 2 and 3, the first external terminal 41 is composed of a metal film 410 provided on the upper surface 12*a* of the second magnetic layer 12 and on an end surface 31*a* of the first columnar wiring 31, a first cover layer 411 provided on the metal film 410, and a second cover layer 412 provided on the first cover layer 411. The metal film 410 includes a first region 410*a* provided on the end surface 31*a* of the first columnar wiring 31 and a second region 410*b* provided on the upper surface 12*a* of the second magnetic layer 12. The thickness $T_1$ of the first region 410*a* is less than the thickness $T_2$ of the second region 410*b* (hereinafter also simply referred to as "$T_1<T_2$").

The second, third, and fourth external terminals 42, 43, and 44 have substantially the same configuration as the configuration of the first external terminal 41. Therefore, the first external terminal 41 alone is described below. In FIG. 2, the first and second cover layers 411 and 412, which form part of the first external terminal 41, are omitted for convenience of illustration.

Since the thickness $T_1$ of the first region 410*a* is less than the thickness $T_2$ of the second region 410*b*, in a case where the inductor component 1 is connected, at the first region 410*a*, to an external circuit, the thickness $T_1$ of the first region 410*a* is enabled to be small; hence, the length of a wiring can be shortened and the circuit resistance can be reduced.

On the other hand, in a case where the inductor component 1 is connected, at the second region 410*b*, to an external circuit, the thickness $T_2$ of the second region 410*b* is enabled to be large; hence, the cross-sectional area of the wiring can be enlarged and the circuit resistance can be reduced.

Thus, in each of the above cases, the circuit resistance can be reduced.

In other words, the circuit resistance cannot be fully reduced only by uniformly controlling the whole thickness of the metal film 410 depending on a portion at which the metal film 410 is connected to an external terminal in some cases as described in the related art. The inventors have performed intensive investigations to solve such a problem and, as a result, have obtained a technical finding that the thickness of the metal film 410 acts differently on the circuit resistance depending on a portion at which the metal film 410 is connected to an external circuit. The relationship "$T_1<T_2$" in the present disclosure has been derived as a result of further investigations by the inventors based on the technical finding such that the thickness of the metal film 410 is set according to different actions.

In detail, in a case where the inductor component 1 is connected, at the first region 410*a*, to an external circuit, the thickness $T_1$ of the first region 410*a* is a factor determining the length of a wiring between the external circuit and the first columnar wiring 31. Reducing the thickness $T_1$ of the first region 410*a* enables the length of the wiring to be shortened and enables the circuit resistance to be reduced.

On the other hand, in a case where the inductor component 1 is connected, at the second region 410*b*, to the external circuit, the thickness $T_2$ of the second region 410*b* is a factor determining the cross-sectional area of the wiring between the external circuit and the first columnar wiring 31. Since the thickness $T_2$ of the second region 410*b* is enabled to be large, the cross-sectional area of the wiring can be enlarged and the circuit resistance can be reduced.

This enables the circuit resistance to be reduced regardless of a portion where the metal film 410 is connected to the external circuit.

The phrase "the thickness $T_1$ of the first region 410*a*" refers to the thickness of the first region 410*a* in the metal film 410 in a direction substantially perpendicular to the first principal surface 10$a$ of the element body 10 that is provided with the metal film 410. Likewise, the phrase "the thickness $T_2$ of the second region 410$b$" refers to the thickness of the second region 410$b$ in the metal film 410 in a direction substantially perpendicular to the first principal surface 10$a$ of the element body 10 that is provided with the metal film 410.

The thickness $T_1$ of the first region 410$a$ and the thickness $T_2$ of the second region 410$b$ are values determined from a FIB-SIM image of a cross section of the inductor component 1. The FIB-SIM image is a cross-sectional image observed with a scanning ion microscope (SIM) using a focused ion beam (FIB). An image can be analyzed using image-processing software (for example, A-zo-kun® developed by Asahi Kasei Engineering Corporation).

The cross section is set to pass through the centerlines of the first and second columnar wirings 31 and 32 of the inductor component 1 as illustrated in FIG. 1B. It suffices that the thickness $T_1$ of the first region 410$a$ and the thickness $T_2$ of the second region 410$b$ have the relationship $T_1<T_2$ in at least one of three thickness determination regions below.

In a first thickness determination region, the thickness $T_1$ of the first region 410$a$ is the thickness of the first region 410$a$ at a first center $C_1$ that is the center between the first interface $B_1$ (corresponding to an outside surface of the first columnar wiring 31) between the second magnetic layer 12 and the first columnar wiring 31 and the second interface $B_2$ (corresponding to an inside surface of the first columnar wiring 31) between the second magnetic layer 12 and the first columnar wiring 31. The thickness $T_2$ of the second region 410$b$ is the thickness of the second region 410$b$ at a second center $C_2$ that is the center between the second interface $B_2$ and the third interface $B_3$ between the metal film 410 and the insulating film 50.

In a second thickness determination region, the thickness $T_1$ of the first region 410$a$ is the thickness $T_1$ of the first region 410$a$ in a range from the first center $C_1$ toward each of the first and second interfaces $B_1$ and $B_2$ up to a length $R_1$. The thickness $T_2$ of the second region 410$b$ is the thickness $T_2$ of the second region 410$b$ in a range from the second center $C_2$ toward each of the second and third interfaces $B_2$ and $B_3$ up to a length $R_2$.

In a third thickness determination region, the thickness $T_1$ of the first region 410$a$ is the thickness of the first region 410$a$ in a region $P_1$ which is a part of the first region 410$a$ that is between the first interface $B_1$ and the second interface $B_2$ and which excludes a range from each of the first interface $B_1$ and the second interface $B_2$ toward the first columnar wiring 31 up to a length $r_1$. The thickness $T_2$ of the second region 410$b$ is the thickness of the second region 410$b$ in a region P2 which is a part of the second region 410$b$ that is between the second interface $B_2$ and the third interface $B_3$ and which excludes a range from the second interface $B_2$ toward the third interface $B_3$ up to a length $r_2$ and a range from the third interface $B_3$ toward the second interface $B_2$ up to a length $r_3$.

In the second and third thickness determination regions, the thickness is measured at a plurality of locations (the number of measurements n being, for example, 3, 5, or the like) and the average of measurement values may be the thickness $T_1$ of the first region 410$a$ or the thickness $T_2$ of the second region 410$b$.

The length (the length in the X-direction) between the first interface $B_1$ and the first center $C_1$ is greater than the sum of the lengths $r_1$ and $R_1$. The length (the length in the X-direction) between the second interface $B_2$ and the second center $C_2$ is greater than the sum of the lengths $r_2$ and $R_2$. The length (the length in the X-direction) between the second center $C_2$ and the third interface $B_3$ is greater than the sum of the lengths $R_2$ and $r_3$. The lengths $r_1$, $r_2$, $r_3$, $R_1$, and $R_2$ are independently, for example, 3 μm to 10 μm in consideration of a range in which the thickness $T_1$ of the first region 410$a$ and the thickness $T_2$ of the second region 410$b$ can be measured, that is, in consideration of the width of the first region 410$a$ and the width of the second region 410$b$.

The lengths $r_1$, $r_2$, and $r_3$ may be the same or different from each other. The lengths $R_1$ and $R_2$ may be the same or different from each other.

The ratio of the length $r_1$ to the width (the length in the X-direction) of the first region 410$a$ and the ratio of the length $R_1$ to the width (the length in the X-direction) of the first region 410$a$ are independently, for example, 5% to 50%. The ratio of the length $r_2$ to the width (the length in the X-direction) of the second region 410$b$, the ratio of the length $r_3$ to the width (the length in the X-direction) of the second region 410$b$, and the ratio of the length $R_2$ to the width (the length in the X-direction) of the second region 410$b$ are independently, for example, 5% to 50%.

In the image analysis of the FIB-SIM image, the position of an interface is visually observed using the color tone (for example, the contrast ratio) of the FIB-SIM image. This enables the thickness $T_1$ of the first region 410$a$ and the thickness $T_2$ of the second region 410$b$ to be measured. Herein, the interface between components made of similar materials can be visually observed. Even when, for example, the first columnar wiring 31 and the metal film 410 contain Cu as a main component, the interface between the first columnar wiring 31 and the metal film 410 can be visually observed. In particular, in a case where the first columnar wiring 31 is formed by an electroplating process and the metal film 410 is formed by an electroless plating process, the first columnar wiring 31 has a structure with higher crystallinity as compared to the metal film 410. The presence of the above interface can be observed based on the difference in crystallinity due to different processes. When the first columnar wiring 31 is substantially composed of Cu and the metal film 410 is composed of Cu, which is a main component, and a trace component (for example, Ni or the like), a location in which the trace component is distributed (that is, the metal film 410) can be determined by mapping an obtained FIB-SIM image using an energy dispersive X-ray (EDX). This enables the presence of the above interface to be confirmed depending on whether a specific trace component is present.

The first external terminal 41 includes the metal film 410, the first cover layer 411, and the second cover layer 412 as described above. Since the first external terminal 41 includes the first cover layer 411 and the second cover layer 412, which cover the metal film 410, a new function can be added to the metal film 410 by imparting different functions to the first and second cover layers 411 and 412.

The metal film 410 mainly contains Cu. The metal film 410 is preferably made of a metal material or alloy containing Cu. This allows the metal film 410 to have high electrical conductivity. In particular, when the magnetic metal particles 136 contain Fe, the metal film 410 can be readily formed by plating. This is because Fe contained in the magnetic metal particles 136 and Cu contained in a plating solution undergo a substitution reaction to form the metal film 410. The metal film 410 preferably further contains Ni. When the metal film 410 contains Ni, the internal stress accumulated in the metal film 410 is relieved.

In the second region 410*b*, the thickness of the metal film 410 is greater than the sum of the thicknesses of the first and second cover layers 411 and 412. In this case, when the metal film 410 is made of Cu, the thickness of the second region 410*b* including Cu, which is excellent in electrical conductivity, is largest. Therefore, the circuit resistance can be reduced.

The first cover layer 411 is a metal layer directly covering the metal film 410 and contains, for example, Ni or the like. The first cover layer 411 has a role in suppressing the electrochemical migration and solder erosion of the metal film 410.

The second cover layer 412 is a metal layer which directly covers the first cover layer 411 and which forms the outermost layer of the first external terminal 41 and contains, for example, Au, Sn, or the like. The second cover layer 412 has a role in ensuring the wettability of solder.

The upper surface 12*a* of the second magnetic layer 12 is in contact with the metal film 410. At least one of the magnetic metal particles 136 is exposed at the upper surface 12*a*. Thus, the metal film 410 is provided on the upper surface 12*a* of the second magnetic layer 12 and is in contact with the exposed surfaces of the magnetic metal particles 136 exposed at the upper surface 12*a*.

Manufacturing Method

Next, a method for manufacturing the inductor component 1 is described.

Figure 4A:
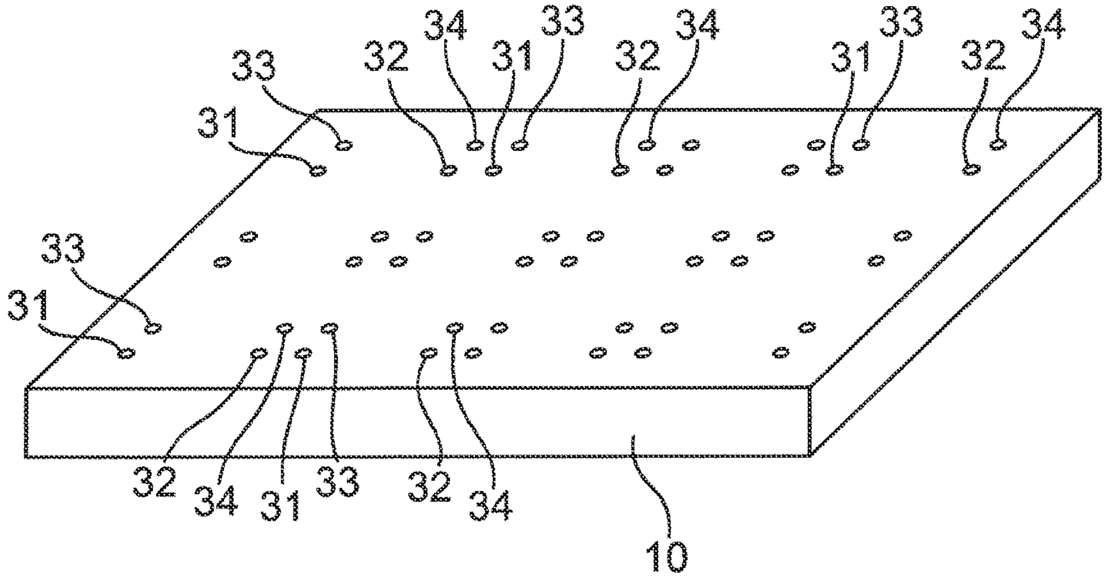
FIG. 4A is an illustration of a method for manufacturing the inductor component.
Figure 4B:
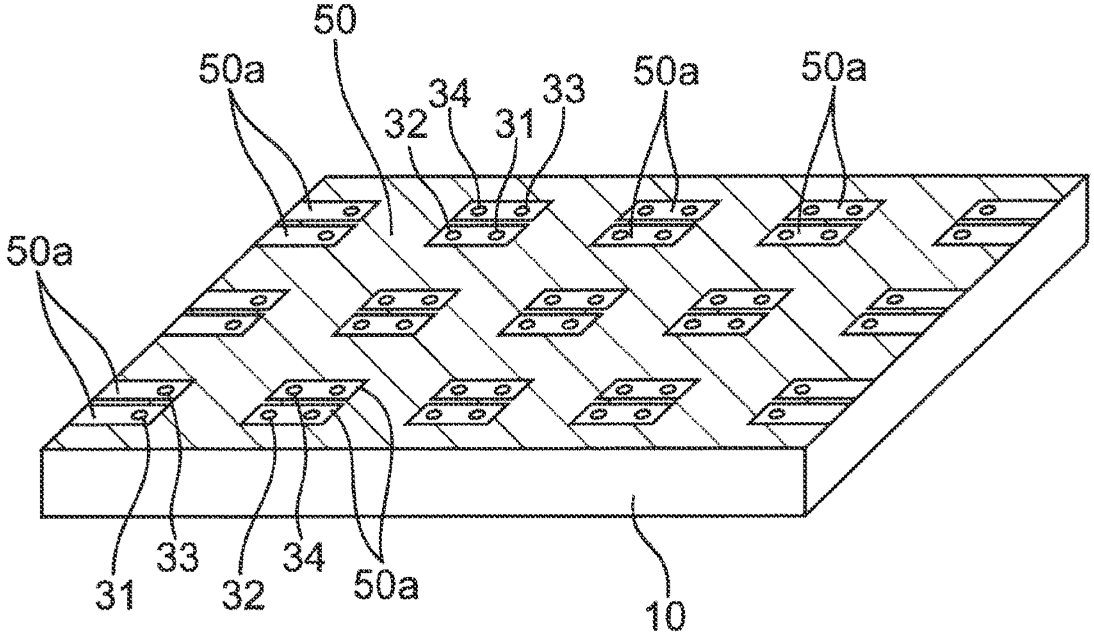
FIG. 4B is an illustration of the method for manufacturing the inductor component.

As illustrated in FIG. 4A, an upper surface of an element body 10 is ground by polishing or the like in such a state that a plurality of inductor wirings 21 and 22 and a plurality of columnar wirings 31 to 34 are covered by the element body 10, whereby end surfaces of the columnar wirings 31 to 34 are exposed from the upper surface of the element body 10. Thereafter, as illustrated in FIG. 4B, an insulating film 50, which is marked by hatching, is formed over the upper surface of the element body 10 by a coating method such as spin coating or screen printing, a dry method such as dry film resist lamination, or the like. The insulating film 50 is, for example, a photoresist film.

Thereafter, in a region for forming external terminals, the insulating film 50 is partly removed by photolithography, laser, drilling, blasting, or the like, whereby through-holes 50*a* are formed in the insulating film 50 such that end surfaces of the columnar wirings 31 to 34 and part of the element body 10 (the second magnetic layer 12) are exposed through the through-holes 50*a*. In this operation, as illustrated in FIG. 4B, the end surfaces of the columnar wirings 31 to 34 may be entirely exposed from the through-holes 50*a* or may be partly exposed from the through-holes 50*a*. Alternatively, some of the end surfaces of the columnar wirings 31 to 34 may be exposed from one of the through-holes 50*a*.

Figure 4C:
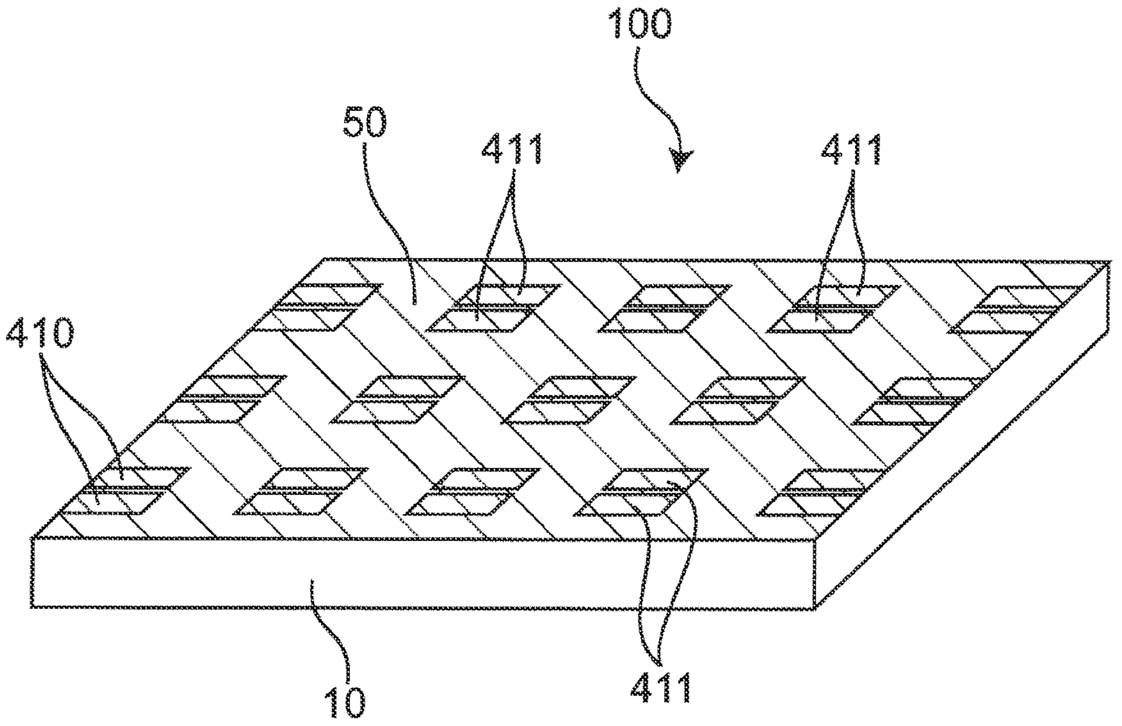
FIG. 4C is an illustration of the method for manufacturing the inductor component.
Figure 4D:
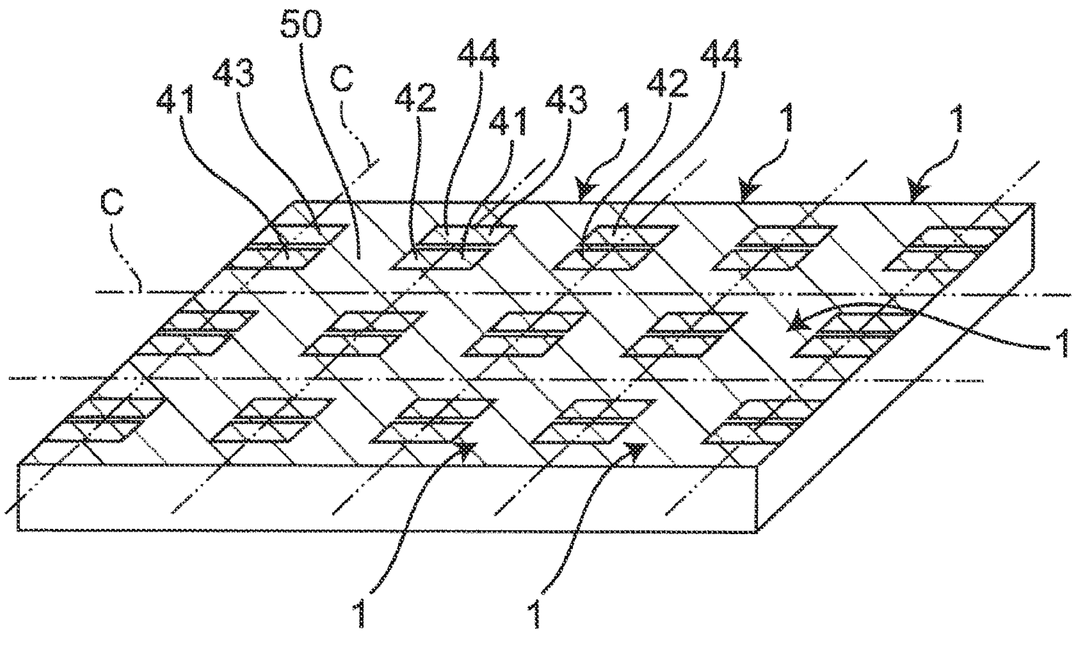
FIG. 4D is an illustration of the method for manufacturing the inductor component.

Thereafter, as illustrated in FIG. 4C, a metal film 410 is formed in the through-holes 50*a* by a method described below and first and second cover layers 411 and 412 are formed on the metal film 410, whereby a mother substrate 100 is configured. The metal film 410 and the first and second cover layers 411 and 412 form external terminals 41 to 44 before being cut. Thereafter, as illustrated in FIG. 4D, the mother substrate 100, that is, the sealed inductor wirings 21 and 22 are diced into pieces for each pair of the inductor wirings 21 and 22 along cutting lines C using a dicing blade or the like, whereby a plurality of inductor components 1 are manufactured. The metal film 410 and the first and second cover layers 411 and 412 are cut along the cutting lines C, whereby the external terminals 41 to 44 are formed. The external terminals 41 to 44 may be prepared in such a manner that the metal film 410 and the first and second cover layers 411 and 412 are cut by such a method as described above or in such a manner that after the insulating film 50 is removed in advance so that the through-holes 50*a* have substantially the same shape as that of the external terminals 41 to 44, the metal film 410 and the first and second cover layers 411 and 412 are formed.

Method for Forming Metal Film 410

A method for forming the above-mentioned metal film 410 is described.

The metal film 410 is formed on end surfaces of the columnar wirings 31 to 34 and on the upper surface of the element body 10 by electroless plating. The metal film 410 is in contact with the element body 10 and is electrically conductive. Plating conditions are controlled so that the thickness $T_1$ of the first region 410*a* is less than the thickness $T_2$ of the second region 410*b*. The metal film 410 is a layer containing, for example, Cu.

In particular, the metal film 410, which contains Cu, is precipitated on the magnetic metal particles 136, which contain Fe, by electroless plating.

In detail, the magnetic metal particles 136 exposed at the upper surfaces 12*a* of the second magnetic layer 12 that is in contact with the metal film 410 function as a catalyst. Metal (for example, Fe) contained in the magnetic metal particles 136 and metal (for example, Cu) used to form the metal film 410 undergo a substitution reaction. As a result, the metal film 410 is formed on the magnetic metal particles 136.

Thereafter, the metal film 410 precipitated on the magnetic metal particles 136 is grown, whereby the metal film 410 is formed on the resin 135 in the second magnetic layer 12. Thereafter, a reducing agent contained in a plating solution decomposes to release electrons and the electrons are supplied to Cu ions in the plating solution, so that a reduction reaction proceeds.

In electroless plating, the reducing agent used may preferably be, for example, formaldehyde. The plating solution may contain a complexing agent such as a Rochelle salt or ethylenediaminetetraacetic acid (EDTA). In the method according to the present disclosure, before plating is performed using the plating solution, plating pretreatment may be performed using a plating pretreatment solution. The plating pretreatment solution contains no catalyst (for example, a Sn—Pd catalyst or the like).

In order to form the metal film 410 on the columnar wirings (Cu) 31 to 34, for example, the metal film 410 precipitated on the magnetic metal particles 136 may be grown so as to extend on the columnar wirings 31 to 34. Alternatively, a Pd layer, that is, a catalyst layer is formed on the columnar wirings 31 to 34, and the metal film 410 may be formed on the catalyst layer by electroless plating.

Method for Forming First Cover Layer 411

The first cover layer 411 is not particularly limited and may be formed by, for example, plating. The first cover layer 411 is formed by, for example, a substitution reaction with the metal film 410.

Method for Forming Second Cover Layer 412

The second cover layer 412 is not particularly limited and may be formed by, for example, plating. The second cover layer 412 is formed by, for example, a substitution reaction with the first cover layer 411.

Second Embodiment

Figure 5:
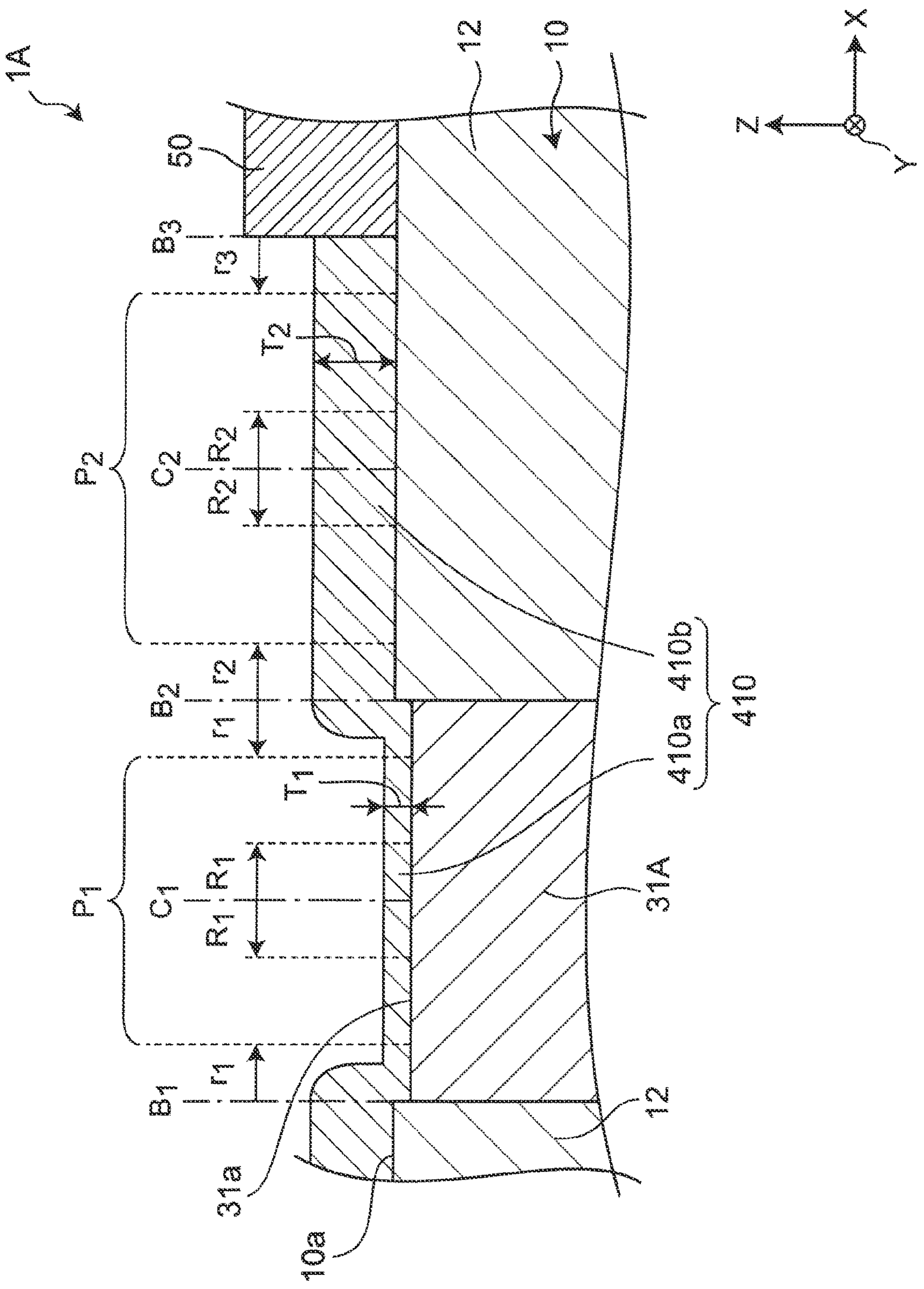
FIG. 5 is a partly enlarged view of an electronic component according to a second embodiment.

FIG. 5 is a partly enlarged view illustrating a second magnetic layer 12 and a metal film 410A in an electronic component 1A according to a second embodiment. The second embodiment differs from the first embodiment in the height of columnar wirings 31 to 34 relative to the upper surface of the second magnetic layer 12. This difference is described below. Other components are substantially the same as those in the first embodiment, are given the same reference numerals as those in the first embodiment, and will not be described in detail.

As illustrated in FIG. 5, in the second embodiment, a concave structure is used unlike a configuration according to the first embodiment in which the first principal surface 10*a* of the element body 10 has a flat structure. In FIG. 5, as well as in FIG. 2, a first cover layer 411 and a second cover layer 412 are omitted.

An end surface 31*a* of a first columnar wiring 31A is lower than the first principal surface 10*a* that is an outer surface of the second magnetic layer 12. Therefore, an outer surface of the second magnetic layer 12 has a concave portion at a position corresponding to the end surface 31*a* of the first columnar wiring 31A. Since the metal film 410A is provided so as to fit into the concave portion, the metal film 410A is firmly connected to an outer surface of the second magnetic layer 12 as compared to a case where the end surface 31*a* of the first columnar wiring 31A is flush with an outer surface of the second magnetic layer 12.

The present disclosure is not limited to the above-mentioned embodiments and can be modified without departing from the scope of the present disclosure.

In the above embodiments, two inductor elements, that is, the first inductor element 2A and the second inductor element 2B are provided in the element body 10. Three or more inductor elements may be provided in the element body 10. In this case, the number of external terminals and the number of columnar wirings are six or more.

In the above embodiments, the number of turns of the inductor wirings in the inductor element is less than one. The number of turns of the inductor wirings may be more than one and the inductor wirings may be curved wirings. The number of layers containing inductor wirings included in the inductor element is not limited to one and a multilayer structure including two or more layers may be used. The first inductor wiring of the first inductor element and the second inductor wiring of the second inductor element are not limited to a configuration in which the first and second inductor wirings are provided on the same plane substantially parallel to the first principal surface. The first and second inductor wirings may be arranged in a direction substantially perpendicular to the first principal surface.

An "inductor wiring" is one that causes inductance in an inductor component by generating magnetic flux in a magnetic layer when a current flows and the structure, shape, and material thereof are not particularly limited. For example, known wirings, such as meander wirings, having various shapes can be used.

In the above embodiments, the metal film 410 and the first cover layer 411 are used as external terminals of the inductor component. The metal film 410 and the first cover layer 411 are not limited to this use and may be, for example, inner electrodes of the inductor component. The metal film 410 and the first cover layer 411 are not limited to being applied to inductor components and may be applied to other electronic components such as capacitor components and resistor components or may be applied to circuit boards equipped with these electronic components. The metal film 410 and the first cover layer 411 may be, for example, wiring patterns for circuit boards.

In the above embodiments, the metal film 410 and the first cover layer 411 are used for external terminals. The metal film 410 and the first cover layer 411 may be used for inductor wirings. That is, a composite body may be used instead of a substrate such that inductor wirings are formed as metal films on the composite body by electroless plating. This enables metal films which serve as inductor wirings and which have the above-mentioned effect to be obtained and enables the metal films to be formed such that the above-mentioned effect is exhibited.

In the above embodiments, the first to fourth columnar wirings 31 to 34 have an end surface at the first principal surface 10*a* of the element body 10 and are used as inner electrodes. The first to fourth columnar wirings 31 to 34 are not limited to this use. That is, the first to fourth columnar wirings 31 to 34 may have an end surface at the first side surface 10*b* or second side surface 10*c* of the element body 10. In this case, the inductor component 1 includes the external terminals 41 to 44 on at least the first and second side surface 10*b* and 10*c* of the element body 10.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An electronic component comprising:

a composite body made of a composite material of resin and magnetic metal particles;

an inner electrode which is provided in the composite body and which has an end surface exposed from an outer surface of the composite body; and a metal film provided on the outer surface of the composite body and on the end surface of the inner electrode, wherein the metal film includes a first region provided on the end surface of the inner electrode and a second region which is provided on the outer surface of the composite body and which is in contact with the magnetic metal particles exposed at the outer surface of the composite body, and a thickness of the first region is less than a thickness of the second region.

2. The electronic component according to claim 1, further comprising:

a cover layer covering the metal film.

3. The electronic component according to claim 1, wherein the cover layer includes a first cover layer covering the metal film, and the first cover layer is made of Ni.

4. The electronic component according to claim 3, wherein the cover layer further includes a second cover layer covering the first cover layer, and the second cover layer is made of Au.

5. The electronic component according to claim 2, wherein the metal film is made of Cu, and in the second region, the thickness of the metal film is greater than the thickness of the cover layer.

6. The electronic component according to claim 1, wherein the end surface of the inner electrode is lower than the outer surface of the composite body.

7. The electronic component according to claim 1, wherein the magnetic metal particles include Fe-based magnetic particles.

8. The electronic component according to claim 1, further comprising:

an inductor wiring provided in the composite body, wherein the metal film defines at least part of an external terminal electrically connected to the inductor wiring with the inner electrode interposed therebetween.

9. The electronic component according to claim 2, wherein the cover layer includes a first cover layer covering the metal film, and the first cover layer is made of Ni.

10. The electronic component according to claim 3, wherein the metal film is made of Cu, and in the second region, the thickness of the metal film is greater than the thickness of the cover layer.

11. The electronic component according to claim 4, wherein the metal film is made of Cu, and in the second region, the thickness of the metal film is greater than the thickness of the cover layer.

12. The electronic component according to claim 2, wherein the end surface of the inner electrode is lower than the outer surface of the composite body.

13. The electronic component according to claim 3, wherein the end surface of the inner electrode is lower than the outer surface of the composite body.

14. The electronic component according to claim 4, wherein the end surface of the inner electrode is lower than the outer surface of the composite body.

15. The electronic component according to claim 5, wherein the end surface of the inner electrode is lower than the outer surface of the composite body.

16. The electronic component according to claim 2, wherein the magnetic metal particles include Fe-based magnetic particles.

17. The electronic component according to claim 3, wherein the magnetic metal particles include Fe-based magnetic particles.

18. The electronic component according to claim 4, wherein the magnetic metal particles include Fe-based magnetic particles.

19. The electronic component according to claim 2, further comprising:

an inductor wiring provided in the composite body, wherein the metal film defines at least part of an external terminal electrically connected to the inductor wiring with the inner electrode interposed therebetween.

20. The electronic component according to claim 3, further comprising:

an inductor wiring provided in the composite body, wherein the metal film defines at least part of an external terminal electrically connected to the inductor wiring with the inner electrode interposed therebetween.

* * * * *